(12) United States Patent
Harris et al.

(10) Patent No.: US 7,356,667 B2
(45) Date of Patent: Apr. 8, 2008

(54) METHOD AND APPARATUS FOR PERFORMING ADDRESS TRANSLATION IN A COMPUTER SYSTEM

(75) Inventors: Jeremy G Harris, Chalfont St Giles (GB); David M Edmondson, Watford (GB)

(73) Assignee: Sun Microsystems, Inc., Santa Clara, CA (US)

( * ) Notice: Subject to any disclaimer, the term of this patent is extended or adjusted under 35 U.S.C. 154(b) by 396 days.

(21) Appl. No.: 10/850,676

(22) Filed: May 20, 2004

(65) Prior Publication Data

US 2005/0154855 A1    Jul. 14, 2005

(30) Foreign Application Priority Data

Sep. 19, 2003    (EP)    ................................. 03255879

(51) Int. Cl.
  *G06F 12/08*    (2006.01)
(52) U.S. Cl. ........................ 711/206; 711/200; 711/202; 711/203; 711/207; 711/208; 709/245; 709/250
(58) Field of Classification Search ................ 711/206, 711/203, 104, 200, 202, 207, 208; 709/245, 709/250
See application file for complete search history.

(56) References Cited

U.S. PATENT DOCUMENTS

| | | | |
|---|---|---|---|
| 5,386,524 A | 1/1995 | Lary et al. | 395/400 |
| 5,856,974 A * | 1/1999 | Gervais et al. | 370/392 |
| 6,526,497 B1 * | 2/2003 | LaBerge et al. | 711/207 |
| 6,665,788 B1 * | 12/2003 | Hughes | 711/206 |
| 6,795,898 B2 * | 9/2004 | Weinreb et al. | 711/119 |
| 6,928,529 B2 * | 8/2005 | Shinomiya | 711/203 |
| 2002/0004894 A1 * | 1/2002 | Hostetter | 711/170 |
| 2004/0054837 A1 * | 3/2004 | Biran et al. | 710/305 |
| 2004/0098535 A1 * | 5/2004 | Narad et al. | 711/104 |

FOREIGN PATENT DOCUMENTS

EP    1198106    4/2002

OTHER PUBLICATIONS

O'Donoghue, K.F. et al., "A Buffer Management Scheme for an Ethernet Local Area Network", Proceedings of the Southeast Conference, New York, IEEE, vol. 1, Apr. 5, 1987, pp. 161-165.
Poo, G-S. et al., "Cut-Through Buffer Management Technique for OSI Protocol Stack", Computer Communications, Elsevier Science Publishers BV, Amsterdam, vol. 14, No. 3, Apr. 1991, pp. 166-177.

(Continued)

*Primary Examiner*—Stephen C. Elmore
*Assistant Examiner*—Daniel Kim
(74) *Attorney, Agent, or Firm*—Darby & Darby PC; John W. Branch

(57) ABSTRACT

An address translation unit is provided for use in a computer system. The unit contains a set of page table entries for mapping from a virtual address to a packet address. Each page table entry corresponds to one page of virtual memory, and typically includes one or more specifiers. Each specifier relates to a different portion of the page, and maps from that portion of the page to a corresponding range of packet addresses. Accordingly, the unit allows for address translation to be performed with a sub-page granularity.

35 Claims, 11 Drawing Sheets

OTHER PUBLICATIONS

"*Dynamic Scatter Gather Table*", IBM Technical Disclosure Bulletin, IBM Corp., New York, vol. 33, No. 38, Aug. 1, 1990, pp. 309-311.

European Search Report in Corresponding EPO Application 03255879.3, mailed Mar. 10, 2004.

* cited by examiner

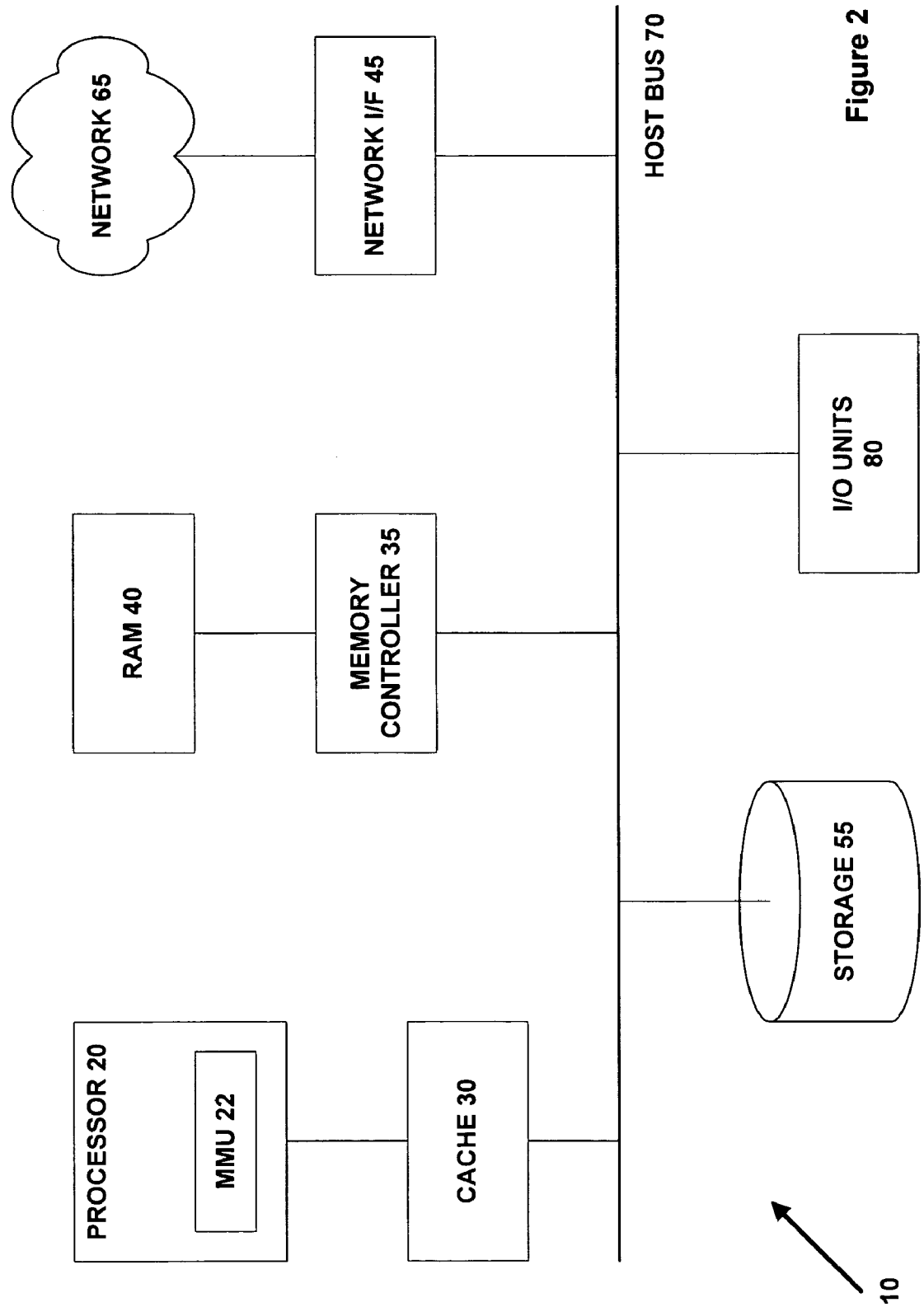

METHOD AND APPARATUS FOR PERFORMING ADDRESS TRANSLATION IN A COMPUTER SYSTEM

FIELD OF THE INVENTION

The present invention relates to computer systems, and in particular to performing address translations in such systems.

BACKGROUND OF THE INVENTION

Many modern computer communication systems are based on having a layered protocol stack. FIG. 1 illustrates an example of such a stack 505. The particular stack depicted in the left-hand portion of FIG. 1 comprises five layers, 501A, 501B, 501C, 501D and 501E, although it will be appreciated that other systems may have a different number of layers. In this configuration, the lower layers are closest to the network hardware, and are typically responsible for aspects such as Error Correction Coding (ECC), while the higher layers are more involved with the application programs that are utilising the communication stack.

As an illustration of one typical stack 505, layer E 501E may represent an Ethernet frame layer. This is responsible for generating frames suitable for transmission over an Ethernet link, normally part of a local area network (LAN). Other hardware architectures may be deployed instead of Ethernet, including asynchronous transfer mode (ATM), token ring, and so on.

Above the Ethernet layer is most commonly an Internet Protocol (IP) layer for layer D 501D, which is then generally followed by a transmission control protocol (TCP) layer as layer C (501C). The TCP/IP layers are normally provided together, and since they form the basic protocol that defines communications on the Internet, they have become extremely popular and widespread over recent years. However, there are alternative possibilities for these layers C and D, such as SPX/IPX.

As an example of the next layer in the stack 505, namely layer B 501B, this may be the hypertext transfer protocol (HTTP). This is the standard protocol used by web browsers to request information from web servers in the World-WideWeb, and runs on top of TCP/IP. Other protocols that could alternatively be used for layer B include the file transfer protocol (FTP), which also runs on top of TCP/IP.

The top layer of the protocol stack 505, namely layer A 501A, might be the use of a Remote Procedure Call (RPC) mechanism based on Extensible Mark up Language (XML). Another possibility here would be the Simple Object Access Protocol (SOAP). This top layer is then called directly by applications running on the system that supports communications stack 505.

It will be appreciated that the number of layers may vary from one system to another, and also depending on which particular application is using the stack 505. For example, a web browser may interact directly with the HTTP layer (layer B 501B) without using a higher protocol layer such as XML/RPC. Likewise, lower down the stack 505 there may be more or fewer layers, depending on the particular network hardware being utilised, and also the particular software implementation adopted for the stack 505.

FIG. 1A shows the transmission of a packet 510 through the protocol stack 505 of FIG. 1. A parcel or chunk of data 511 is supplied to the top layer in the stack 505, namely layer A 501A, by an application that wishes to send the data parcel 511 out over the network. Usually, as the packet 510 is passed from one protocol layer down to the next protocol layer, some header information is prepended to the packet received from the layer above. In addition, some layers may also append a trailer to the packet as well (not shown in FIG. 1A).

Therefore as the data packet 510 is initially passed into layer A 501A, it comprises only data chunk 511. However, when it is passed out of layer A 501 down to layer B 501B as data packet 510A, a header portion (shown as AH) has been prepended to data chunk 511 by layer A 501A. Following the packet further down, layer B 501B prepends its own protocol header (BH) to packet 510A to create packet 510B, which is passed down to layer C 501C. This process is then repeated down through the protocol stack 505, with layer C 501C prepending header portion CH to make packet 510C, layer D 501D prepending header portion DH to make packet 510D, and layer E 501E prepending header portion EH to make packet 510E. It is this packet 501E that is finally passed out onto the network from the bottom of the stack 505.

The final output data packet 510E in FIG. 1A therefore comprises five separate header components, AH, BH, CH, DH, and EH, one from each layer of the protocol stack. It will be appreciated that in combination these headers should, if possible, be small compared to the data portion 511; if this is not the case, then bandwidth communications efficiency will be rather poor. (Note that although in FIG. 1A the headers for the different layers are shown as the same size, in practice the header size will typically vary from one layer to another).

The header prepended by each layer comprises information for that layer to perform its appropriate processing tasks. For example, the header (EH) from layer E 501E typically includes an ECC portion, while the header in the IP layer 501D generally includes an Internet address and other associated information. Note that a layer can only interpret its own header—any other headers present are simply regarded as part of the data. For example, layer C regards packet 510C as comprising two portions, namely header C and a remaining portion which layer C simply treats as data (i.e. the message to be processed). It is quite transparent to layer C that this remaining data portion in fact includes two other headers (BH+AH) in combination with the original data chunk 511.

Considering now the receipt of an incoming packet from a communications network, the opposite chain of processing occurs. Thus rather than adding protocol headers to the packet, each layer instead has to strip out the protocol header associated with that particular layer, before passing the remainder of the packet up to the next layer in the protocol stack. (Each layer also has to strip out any packet trailers associated with that particular layer).

For example, when a packet 510E is received over a network into layer E 501E, this layer removes the protocol header element for that layer (EH) and performs any relevant processing (such as checking that the ECC is correct, in order to confirm that the packet has not been corrupted at all during transmission). Layer E 501E then passes the remaining packet 510D (i.e. the received packet 501E, but now stripped of header EH) up to layer D 501D. The process then repeats layer by layer, until layer A 501A strips its protocol header (AH) from packet 510A. This leaves just the original data portion 511 in packet 510 to be passed up to the receiving application.

The use of a multilayered communications stack 505 such as shown in FIGS. 1 and 1A has many advantages. In particular it isolates individual layers from having to know the details of the particular hardware and protocol stack beneath or above them, and for this reason it has become very widely adopted in computer communication systems. Nevertheless, certain difficulties remain with a practical implementation of protocol stack SOS. In particular, there can be a significant amount of data copying as a packet 510 progresses up the communications stack. This represents an expensive and time-consuming memory operation.

One reason for such copying is that data to be passed from one layer to the next layer is frequently not located on an appropriate byte boundary. For example, when packet 510E is initially received into a system, it will typically be properly aligned on a word boundary (e.g. a four-byte boundary or such like). However, protocol header EH itself may not comprise a whole number of words, and indeed may potentially vary in size from one packet to another. Thus once this protocol header EH has been stripped by processing within layer E 501E, the resulting packet (corresponding to packet 510D) may well not be aligned on a word boundary. Consequently, layer E (501E) cannot pass a simple reference to packet 510D, as created within packet 510E, up to layer D, since such a reference can only be used with word-aligned data. Rather, layer E typically has to generate a fresh copy of packet 510D, by duplicating what it regards as the data portion of packet 510E (i.e. headers DH, CH, BH and AH, plus data chunk 511) onto a word boundary. Layer E is then able to pass a reference to this newly created (copied) packet 510D up to layer D.

This process is then repeated at each successive layer in the protocol stack 505. Thus the data portion 511 may be copied five times (once for each layer in the protocol stack) before it is finally made available to the receiving application. It will be appreciated that this copying represents a significant processing overhead in handling incoming data communications, especially since, as indicated above, the data portion 511 normally forms the major portion of packet 510.

A further problem is that the size of communications packet to be utilised may vary from one layer to another. Thus although it is generally desirable for reasons of bandwidth efficiency for the data portion 511 to be large compared to the header portions (AH, BH, etc.), there are also factors that limit the packet size that can be usefully employed in a given situation. For example, in some cases the network or protocol architecture may have an intrinsic constraint on packet size (e.g. ATM has a fixed cell size). In other circumstances, the packet size may be limited for performance reasons, such as when the sending site is configured to wait for an acknowledgement that a packet has safely arrived at its destination before continuing with other processing.

The optimum packet size in any given situation can also depend on the error rate (which may vary according to environmental circumstances). Thus if data is lost or corrupted during transmission, and this is detected (but not corrected) by the ECC, then the relevant packet needs to be re-transmitted. If too large a packet size is adopted, then the chance of a packet being transmitted without corruption becomes small. Consequently, the proportion of packets that have to be re-transmitted rises, and so efficiency drops.

The above factors can lead to different layers in the protocol stack using different packet sizes. In particular, although FIG. 1A shows a one-to-one correspondence for packet 510 between the different layers of the protocol stack, it is common in practice for a packet to get subdivided into smaller packets as it descends a protocol stack. Conversely, received packets then get (re)assembled into larger packets as they ascend a protocol stack.

This is illustrated schematically in FIG. 1B, which shows a protocol stack comprising Layer A and Layer B. Initially Layer A receives a packet 540 comprising data segment 531. Layer A prepends header AH 535 to this data segment to form packet 540A, which is then passed to Layer B. As previously explained, from the perspective of Layer B, packet 540A simply represents data to be transmitted—in other words, the division of packet 540A into a header portion 535 and a data portion 531 is transparent to Layer B.

It is assumed that Layer B utilises a smaller packet size than Layer A (e.g. perhaps because of the physical characteristics of the particular network link involved). Accordingly, Layer B divides packet 540A into two packets 540B1, 540B2, the first containing the header AH 535 and a portion of the data 531 (denoted as 531A), the second containing the remainder of data 531 (denoted 531B). Layer B also prepends its own header to each of the two packets, namely header BH1 536A for packet 540B1 and header BH2 536B for packet 540B2. Packets 540B1 and 540B2 can now be passed to any other (lower) levels in the communication stack. These lower levels may potentially perform further subdivisions, before transmitting the packets out over the relevant communications link.

Now consider the reverse process, in which packets 540B1 and 540B2 are received over a network link into Layer B. As described in relation to FIG. 1A, when Layer B receives these packets it strips out the associated headers for this layer, namely BH1 536A and BH2 536B. Layer B then (re)assembles packet 540A by combining the data portion from packet 540B1 (i.e. AH 535 in conjunction with data 531A) and the data portion from packet 540B2 (i.e. data 531B).

Unfortunately, combining packets 540B1 and 540B2 into a single packet 540A generally involves having to copy the data of the packet. Thus even if packets 540B1 and 540B2 are stored contiguously in Layer B, header BH2 536B will be sandwiched between data segment 531A and data segment 531B. Accordingly, once the header portion BH2 536B has been stripped out by Layer B, there will be a gap between the data segments 531A and 531B. Therefore, in order to generate a single packet 540A that contains data 531 in a contiguous block, Layer B copies the data segments of packets 540B1 and 540B2 into a new packet where these two segments are adjacent to one another. This new packet is then passed to Layer A as packet 540A. It will be appreciated that the data copying associated with the reassembly of such subdivided packets again represents a significant overhead in handling incoming data communications.

SUMMARY OF THE INVENTION

Accordingly, one embodiment of the present invention provides an address translation unit for use in a computer system. The address translation unit comprises a set of one or more translation table entries for mapping from an application address to a packet address. Each translation table entry corresponds to a block of memory, and includes multiple specifiers, each specifier relating to a different portion of the relevant block of memory. The specifiers map from application addresses in their respective portions of the block of memory to corresponding packet addresses.

In one embodiment, the application address is presented as a virtual address, and the resulting packet address is also a virtual address. This has the advantage that the desired translation can normally be specified by a single offset in a shared linear address space. In particular, a specifier may map from an application address to a corresponding packet address by providing an offset between the two. Thus each application address in the portion of memory corresponding to a specifier is converted into a packet address by adding an offset appropriate to that particular specifier. It is also possible for both the application address and the packet address to be provided as real addresses, or for the application address to be a virtual address, and the packet address to be provided as a real address.

The form of the application and packet address impacts the relationship between the address translation unit and a memory management unit (MMU), which is used for performing conventional virtual to physical address mappings in a computer having a virtual memory system. Thus if the address translation unit is upstream of the MMU it will generally utilise virtual addresses, while if it is downstream of the MMU it will generally utilise real addresses. Note that in either case the address translation unit may be incorporated into the MMU hardware, but as a separate logical component respectively before or after the virtual-to-real page mapping functionality. Alternatively, the address translation unit may be integrated into the virtual-to-real page mapping hardware itself. In this case, it has a virtual address as input for the application address and a real address as output for the packet address.

It is convenient for a block of memory corresponding to a translation table entry to represent a page of memory (where a page represents the unit of memory used for virtual to real address mapping and for swapping between memory and disk). This then allows the appropriate translation table entry for a virtual application address to be located in the same manner (using the analogous hardware) as a page table entry in the MMU. Typically this involves caching at least some of the translation table entries in a content accessible memory (CAM). In other embodiments, a block of memory corresponding to a translation table entry may differ in size from a page of memory.

Note that the look-up of the application to packet address conversion is a two-stage process, in that a translation table entry is found first, and then a specifier is located within this translation table entry. Increasing the size of the block of memory corresponding to a translation table entry therefore tends to decrease the total number of translation table entries, but to increase the number of specifiers per translation table entry. It will be appreciated that the total memory capacity required for the address translation unit, as well as access time to the specifiers, will vary according to the selected size of the block of memory. This can be tuned to optimise performance in the particular circumstances; for example the amount of cache memory available to the address translation unit, the size of memory portions generally associated with a specifier (which will reflect typical packet size), and so on.

In certain embodiments, there may only be a single translation table entry covering all memory. In this situation, the first-stage of the look-up process becomes (in effect) redundant. Also, the size of the block of memory associated with a translation table entry may potentially vary from one entry to another, perhaps if different regions of memory are being used for very different forms of processing (although this may complicate the identification of a translation table entry corresponding to a particular application address).

Note that a translation table entry supports multiple mappings per block of memory. Thus each specifier within a translation table entry usually has a different offset value to convert from application address to packet address. This enables an extremely precise form of address translation; indeed, the address translation unit generally supports a one-byte granularity of mapping. Contiguous application addresses within the same page (or block) of memory can therefore map to discontiguous packet addresses, assuming that the application addresses are associated with different specifiers.

Typically each specifier contains limits defining the portion of memory (i.e. the range of application addresses) to which that specifier relates. For example, a specifier may contain a start address and an end address, or alternatively a start address and a size. The different specifiers associated with a selected translation table entry may then be stored or loaded into a CAM.

In one embodiment, the specifiers associated with a translation table entry have a hierarchical arrangement. Such a structure reduces hardware complexity by limiting the size of the CAM required. In one particular implementation, there are two types of specifier, namely a translate specifier and a retry specifier. A translate specifier details a mapping from an application address to a packet address, while a retry specifier drops the lookup one level down the hierarchy. Each level in the hierarchy then typically contains multiple translate specifiers, and one retry specifier (except for the bottom layer in the hierarchy, which does not contain a retry specifier). In operation, a lookup process starts at the first level in the specifier hierarchy, and finds the specifier corresponding to the application address to be converted. If the specifier found is a translate specifier, then the address mapping is provided directly. However, if the specifier found is a retry specifier, processing drops to the next level in the specifier hierarchy. These operations then repeat until a translate specifier is found. It will be appreciated that the skilled person will be aware of various other lookup structures and procedures that could be adopted for storing and accessing the specifiers in a translation table entry.

In one particular embodiment, the method for locating a specifier corresponding to a particular address within a translation table entry comprises searching the translate specifiers for the translation table entry to locate a translate specifier corresponding to the application address. If a translate specifier is located corresponding to the application address, the mapping in that specifier is used to perform the translation from application address to packet address. However, if a translate specifier is not located corresponding to the application address, a search is made for a retry specifier corresponding to the application address. If a retry specifier is found corresponding to the application address, a translation table entry identified by the retry specifier is accessed. The process is then repeated until the appropriate translate specifier for the application address is found. (Note that in this approach, each lower level in the specifier hierarchy is regarded as a further translation table entry, rather than a single translation table entry containing multiple levels of specifiers).

An address translation unit such as described above for converting from application address to packet address is typically incorporated into a computer system that also has a multilayered communications stack. The address translation unit is operable to convert between an application address used in a higher layer of the communications stack and a packet address used in a lower layer of the communications stack. It will be appreciated that this obviates the need for each layer in the communications stack to copy packet data into a contiguous section of memory for passing to the next layer up in the stack. Rather, the next layer can simply be passed an application address for the packet, and leave the underlying packet data still stored in discontiguous portions of memory (such as illustrated in FIGS. 1A and 1B). The next layer then uses the (contiguous) application addresses to access the data, with the address translation unit mapping transparently to (discontiguous) packet addresses in order to locate the data in memory.

Another embodiment of the invention provides a method of operating an address translation unit in a computer system. The method comprises providing a set of translation table entries, where each translation table entry corresponds to a block of memory and maps from application addresses to packet addresses for the corresponding block of memory. In addition, multiple specifiers within each translation table entry are provided. Each specifier relates to a different portion of the block of memory corresponding to the relevant translation table entry, and maps from application addresses in that portion of the block of memory to the corresponding packet addresses.

In operation, an application address is typically received and used to determine a translation table entry corresponding to a block of (logical) memory containing the application address. A specifier corresponding to a portion of memory associated with the application address is then found within this translation table entry. The application address can now be mapped to the corresponding packet address using translation information within the located specifier.

In one particular embodiment of the invention, the application address is received by a second layer in a protocol stack from a first layer in the protocol stack. The application address is used to refer to data from one or more incoming data packets that are being passed up the protocol stack. The first layer processes the incoming data packets to strip out header information of relevance to the first layer. Once this header information has been removed, the incoming data packet may be discontiguous, and/or may not be aligned on a word boundary. Accordingly, the translation table entry or entries associated with the incoming data packets are updated to reflect the stripped out header information. In particular, the updated translation table entries allow the incoming data packet to be presented to the second layer as a word-aligned, contiguous set of application addresses.

The first layer may also combine two or more separate incoming packets into a single data packet for passing to the second layer. This combination of packets may be accomplished by providing a suitable set of mappings in the appropriate translation table entry (or entries), rather than by any manipulation or copying of the underlying data per se. These mappings allow the second layer to treat the (logically combined) incoming data packet as occupying a contiguous range of application addresses, appropriately word-aligned.

Such an approach therefore avoids the first layer having to copy the incoming data packet(s) into a contiguous block of word-aligned memory before passing them to the second layer. Instead, the address translation unit is responsible for mapping from the (contiguous) application addresses for the data packet to the underlying (discontiguous) packet addresses. This mapping process is transparent to the second layer, which simply uses the application addresses to access and manipulate the data packets.

In accordance with another embodiment of the invention, there is provided an address translation unit for use in a computer system. The unit includes a set of translation table entries for mapping from an application address to a packet address. Each translation table entry corresponds to a block of memory. The mapping is performed at a one-byte granularity.

In accordance with another embodiment of the invention, there is provided a method of handling incoming data packets in a communications protocol stack comprising at least a first layer and a second layer. The method includes receiving one or more incoming data packets in the first layer, and processing the incoming data packets in the first layer to strip out header information associated with the first layer. An address translation unit that maps from application address to packet address is updated to reflect the stripped out header information, and an application address for the one or more incoming data packets is then passed to the second layer in the protocol stack.

It will be appreciated that such processing can be repeated as the incoming data packets are passed further up the communications stack. For example, the second layer itself may process the data packets received from the first layer in order to strip out header information associated with the second layer (and/or to perform further packet combination). In this case, the second layer updates the address translation unit to reflect the header information that it has stripped out, and passes application addresses for the incoming data packets to a third layer in the protocol stack (which is assumed to be above the first and second layers). The third layer can then use the application addresses to access the incoming data packets via the address translation unit.

Note that if the second layer updates the translation table entries, due account must be taken of any existing translation table entries (as entered by the first layer in the communications stack). In other words, the translation table entries must reflect the full set of mappings from each layer in order to provide a correct overall translation from application address to packet address.

Another embodiment of the invention provides a communications system including a protocol stack for handling incoming data packets. The protocol stack comprises at least a first layer and a second layer, and an address translation unit operable to map from an application address to a packet address. The first layer processes one or more incoming data packets to strip out header information associated with the first layer, and updates the address translation unit to reflect the stripped out header information. The second layer receives an application address for the incoming data packets from the first layer in the protocol stack, and uses the application address to access the incoming data packets via the address translation unit.

Another embodiment of the invention provides apparatus for operating an address translation unit in a computer system comprising: means for providing a set of translation table entries, in which each translation table entry corresponds to a block of memory and maps from application addresses to packet addresses for the corresponding block of memory; and means for providing multiple specifiers within each translation table entry, where each specifier relates to a different portion of the block of memory corresponding to the relevant translation table entry, and maps from application addresses in that portion of the block of memory to the corresponding packet addresses.

Another embodiment of the invention provides apparatus for handling incoming data packets in a communications protocol stack comprising at least a first layer and a second layer comprising: means for receiving one or more incoming data packets in the first layer; means for processing in the first layer the one or more incoming data packets to strip out header information associated with the first layer; means for updating an address translation unit that maps from application address to packet address to reflect the stripped out header information; and means for passing an application address for the one or more incoming data packets to the second layer in the protocol stack.

BRIEF DESCRIPTION OF THE DRAWINGS

Various embodiments of the invention will now be described in detail by way of example only with reference to the following drawings in which like reference numerals pertain to like elements and in which:

FIG. 2 is a simplified schematic diagram of a typical computer system;

DETAILED DESCRIPTION

Figure 1:
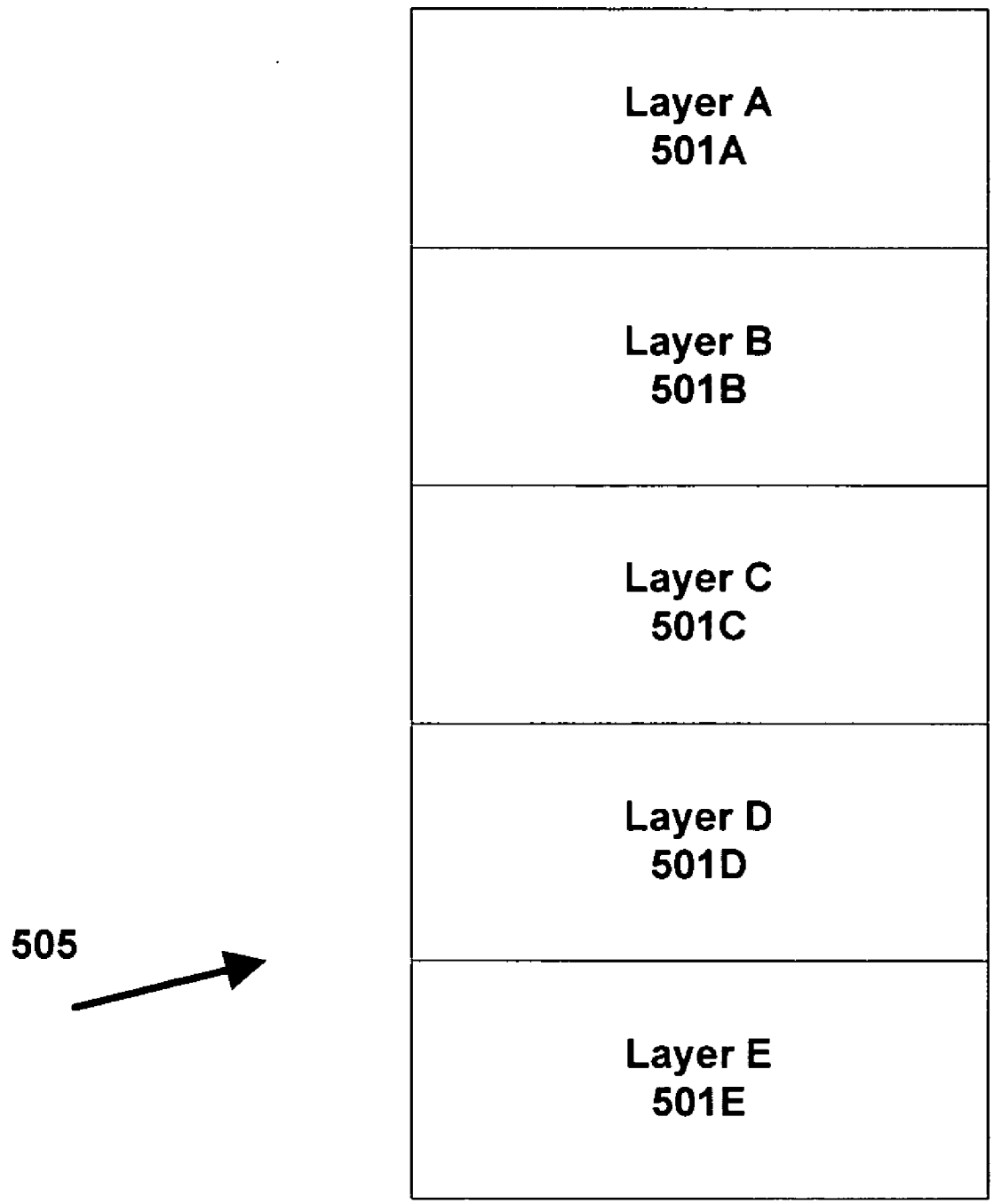
FIG. 1 is a schematic diagram showing a protocol stack.

FIG. 2 is a schematic diagram depicting the main hardware components of a typical computer system 10. (It will be appreciated that this is purely by way of example, and the skilled person will be aware of a very wide range of configurations other than that shown in FIG. 1). The various components of the computer system 10 are interconnected by a bus 70, which may in practice be implemented by a hierarchy of different speed buses, to provide communications between the components. Note that a switching fabric can sometimes be provided instead of the bus, this being particularly the case in higher-end systems, such as a large-scale server.

At the heart of computer system 10 is a processor 20, also known as a central processing unit (CPU), which is responsible for executing program instructions and directing the overall operations of system 10. Many modern systems support multiprocessing, either by having more than one processor unit, or (and) by forming separate processing cores within a single semiconductor device.

Random access memory (RAM) 40 is provided for the volatile storage of program instructions and data for utilisation by the processor 20. The operation of RAM 40 and its interaction with host bus 70 is controlled by a memory controller 35, which is located directly between RAM 40 and bus 70. The connection between the memory controller 35 and RAM 40 can be provided by a separate bus or any other suitable form of data link. (It is also possible for the memory controller to be implemented in a single device with RAM 40, or potentially with processor 20). There may be multiple memory controllers, each coupling one or more blocks of RAM to the bus 70.

Computer system 10 also includes various other devices attached to bus 70. These typically include a network interface unit 45, I/O units 80, and non-volatile storage 55. The network interface unit 45 allows system 10 to send data out over and receive data from network 65 (which may for example be the Internet). It will be appreciated that any given computer system may in fact be linked to multiple networks, such as by a telephone modem, by a LAN interface unit, and so on. The various I/O units 80 typically comprise one or more keyboards, monitors, and so on. These allow users to directly interact with system 10. Non-volatile storage 55 is normally provided by one or more hard disk drives (potentially configured into an array), but may also include tape storage and/or optical storage (such as a CD-ROM, DVD, etc). Storage 55 may be dedicated to one particular computer system 10, or may be shared between multiple systems via an appropriate connection, such as a fibre channel network.

The processor 20 typically operates at a much higher speed than host bus 70 and RAM 40. Therefore, in order to avoid processing delays while data is being accessed, a cache 30 is provided. This has a smaller capacity than RAM 40, but can provide a much faster response to the processor 20. Thus in effect, cache 30 provides processor 20 with a fast, local copy of selected data from RAM 40. Note that many systems now utilise a multi-level cache hierarchy, with at least the lowest (smallest) level of cache being integrated directly into processor 20.

The processor 20 generally accesses data and instructions from memory by means of a virtual address (typically either a 32-bit or 64-bit number in modern systems). This virtual address is converted into a real address representing a physical location in RAM 40 by a hardware memory management unit (MMU) 22 included within the processor 20.

Note that normally RAM is too small to be able to accommodate the entire address range of processor 20. Therefore, only selected portions of the address range are stored in RAM, with the remainder being backed out to hard disk 55. The portions of address space stored out to disk get promoted (swapped) into RAM 40 when access is required by the processor 20; conversely, such portions are swapped back out to disk when they are no longer needed by the processor 20. The (fixed) unit of memory transfer between RAM and the hard disk is known as a page of memory.

Figure 3:
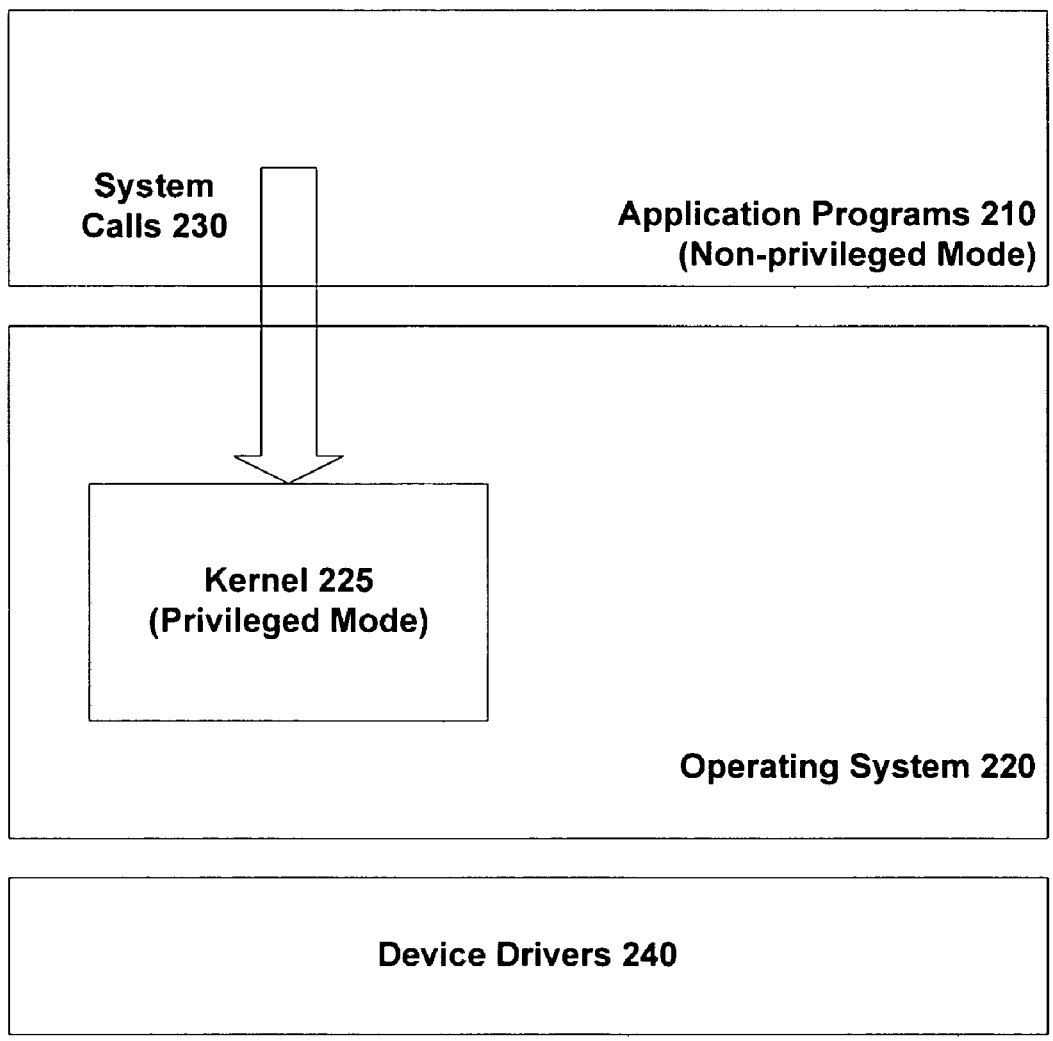
FIG. 3 is a simplified schematic diagram of the main software components running on the computer system of FIG. 2.

FIG. 3 is a schematic diagram of the main software components running on a computer system such as that shown in FIG. 2. In particular, there are one or more application programs 210 running (in non-privileged mode) on top of the operating system 220. The core of the operating system is the kernel 225, which runs in privileged mode. Applications can access functionality in the kernel by making system calls 230, typically via a system application programming interface (API). Also shown in FIG. 2 is a layer of one or more device drivers 240. A device driver is a low-level code block to allow the operating system 220 to interact with various hardware devices, such as graphics cards, network adapters, and so on. The communication stack 505 from FIG. 1 is generally provided as part of the operating system 220, although higher levels of the stack may be incorporated into application programs 210, while lower levels are often included in device drivers 240.

The software components shown in FIG. 3 are generally loaded from memory 40 into processor 20 for execution (see FIG. 2). Some or all of these components may be pre-installed onto hard disk 55, or loaded off some portable storage medium, such as a magnetic tape, CD ROM, DVD, etc (not shown in FIG. 2). Alternatively, some or all of the software may be downloaded via a transmission medium over network 65. Note that software obtained from a transmission or portable storage medium may be saved onto storage subsystem 55 for subsequent (re)use by system 10, or may be loaded directly for execution into memory 40.

Figure 4:
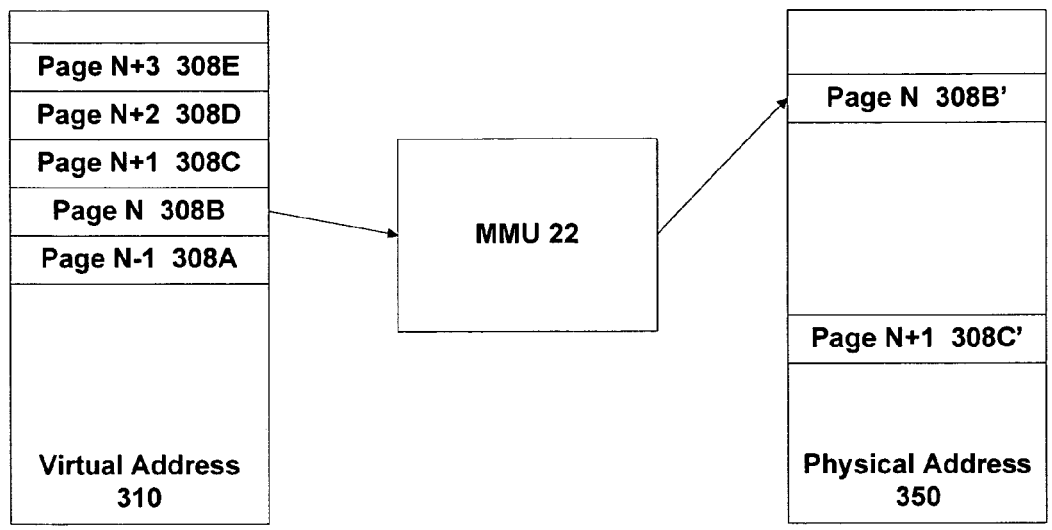
FIG. 4 is a schematic diagram of a known virtual memory system as typically implemented in the computer system of FIG. 2.

FIG. 4 is a schematic diagram of a known address translation process for use within a computer system such as shown in FIG. 2. A linear virtual address space 310 is used by the processor 20, with a given virtual address typically being interpreted as the combination of a page number and an offset into the page. In order to access the physical memory associated with an address, the system uses the page number for the address to access the MMU 22. The MMU 22 maintains a page table, in which each page has its own translation table entry (TTE). The TTE for a page specifies the location of that particular page in physical memory 350. For example, as depicted in FIG. 4, page N 308B in virtual memory 310 corresponds to page 308B' in real memory 350. Note that in a multitasking system, a separate set of virtual to physical address mappings may be maintained for each process (i.e. each process has its own virtual address space).

As illustrated in FIG. 4, a contiguous sequence of pages in virtual address space, e.g. N–1 through to N+3) does not necessarily have to be reproduced in the same sequence in physical memory 350. Thus in physical memory, the pages may be separated from one another and/or stored in a different order compared to their virtual addresses. For example, as illustrated in FIG. 4, pages N and N+1 are contiguous in virtual memory, but in physical memory they are separated, and also in the reverse order (i.e. page N+1 has a higher virtual address than page N, but a lower physical address).

In operation, an address translation using MMU 22 is typically performed by decomposing a virtual address 310 into a page number (representing say the 19 most significant bits of the address) and an offset into this page (say the remaining 13 bits of the address). The physical address 350 corresponding to the virtual address is then derived by firstly using the MMU 22 to determine the corresponding real page of memory, and then applying the same offset into this real page as for the virtual page.

As previously indicated, the virtual memory space normally exceeds the available physical memory (sometimes significantly). Therefore, the system swaps pages into and out of physical memory according to the particular needs of the processor 20, with swapped out pages being stored on hard disk 55. The TTE for a particular page indicates if the page is currently swapped out of memory. In addition, the number of pages in a system may be rather large. For example, in a 32-bit system using 8 Kbyte pages, there are potentially half a million pages. In general, it is not possible to store the TTEs for all these pages in the MMU 22. Therefore, the page table itself may be largely stored out on disk. However, a certain portion of the page table is usually cached for rapid access in a translation lookaside buffer (TLB) incorporated into the MMU.

In a typical implementation, the size of a single page 308 is 8 Kbytes, but a range of page sizes is known in the art. For example, in various versions of the Solaris operating system, available from Sun Microsystems, the available page size ranges from 4 Kbytes up to 4 Mbytes. (See "Solaris Internals: Core Kernel Architecture", by Mauro and McDougall, Sun Microsystems Press, 2001, ISBN 0-13-022496-0, for further details about the Solaris operating system, as an example of a known virtual memory system).

Figure 5:
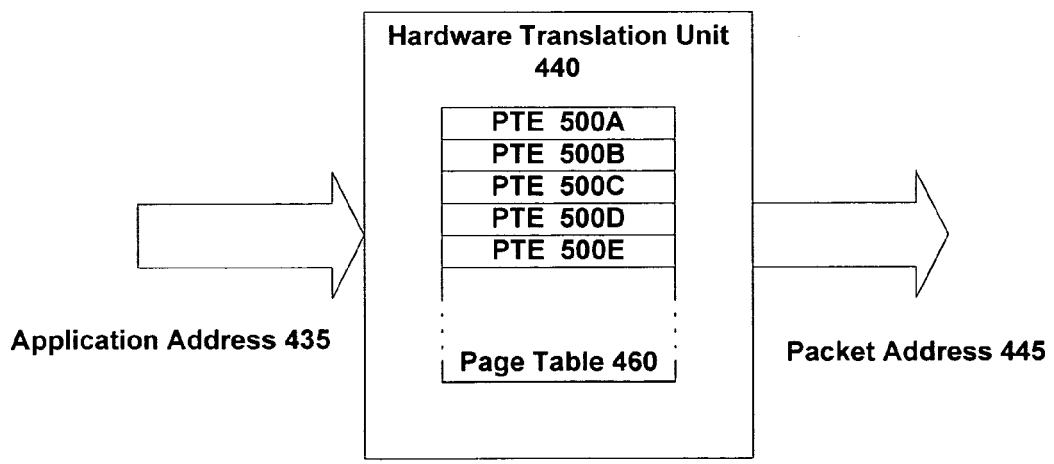
FIG. 5 is a schematic diagram illustrating a hardware translation unit in accordance with one embodiment of the invention.

FIG. 5 illustrates an address translation subsystem in accordance with one embodiment of the invention, which includes a hardware translation unit 440 that converts an application address 435 into a packet address 445. Hardware translation unit 440 may be conveniently incorporated into the MMU 22 of an existing system, but may also be provided as a separate component.

In one embodiment the application address 435 and the packet address 445 are both virtual addresses (in contrast to the conventional address translation performed by the MMU 22, where a virtual address is input and a real address is output). However, in other implementations the hardware translation unit 440 may transform a virtual application address 435 into a real packet address 445. A further possibility is that both the application address 435 and the packet address are real, in which case the address translation converts one real address into another real address.

The particular format of the application address 435 and the packet address 445 typically depends upon (or influences) the relationship between the hardware translation unit 440 and the MMU 22. For example, if the hardware translation unit 440 is incorporated into the MMU, then it may be most convenient for application address 435 to be a virtual input address and for packet address 445 to be a real output address. Alternatively, if the application and packet addresses are both real addresses, then hardware translation unit 440 is most likely downstream of the MMU, while if the application and packet addresses are both virtual addresses, then hardware translation unit 440 is most likely upstream of the MMU 22. (Downstream and upstream here refer to the normal flow direction of memory access requests from processor 20 to memory 40).

As shown in FIG. 5, hardware translation unit 440 incorporates a page table 460 comprising multiple page table entries (PTEs) 500A, 500B, 500C, 500D, 500E, etc (these may also be referred to as translation table entries). Each PTE contains information for translating an application address 435 located in that particular page into a corresponding packet address 445.

It is convenient for the pages used in page table 460 to correspond to those used in the main memory system for swapping pages in and out of real memory (such as page 308 in FIG. 4). This then allows the hardware for identifying a PTE 500 corresponding to any given address to be based on analogous hardware already incorporated into an MMU 22. Indeed having page table 460 based on standard page units generally allows the hardware translation unit 440 to be more easily integrated into the MMU 22. However, the hardware translation unit 440 could instead be based on a different size of memory portion or segment from that used by the virtual memory system, in which case, each PTE 500 in table 460 would correspond to one relevant portion of memory, rather than to a page (as used in the virtual memory system).

Figure 5A:
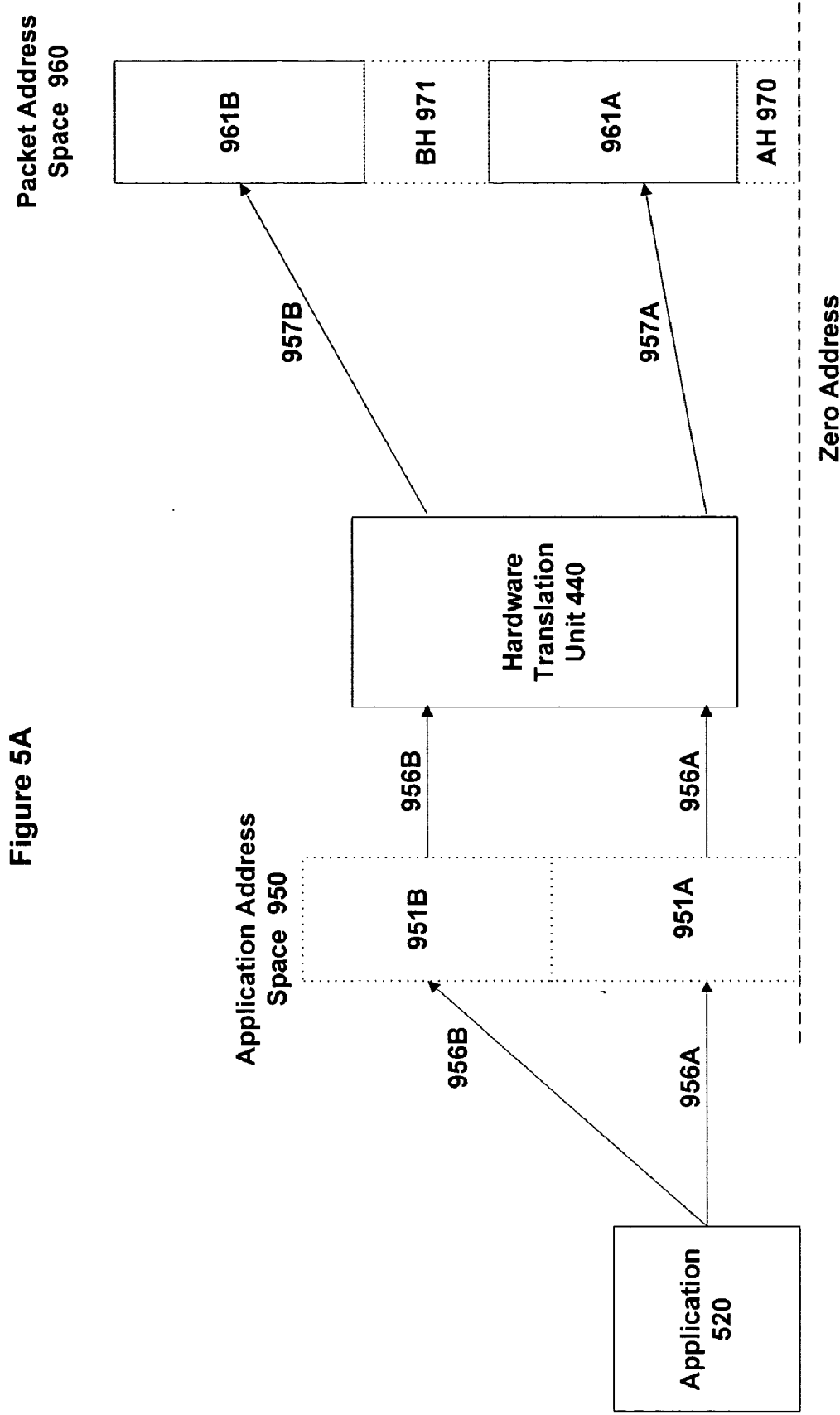
FIG. 5A is a schematic diagram illustrating the use of the hardware translation unit of FIG. 5.

FIG. 5A illustrates the use of the hardware translation unit 440 to map from an application address 435 to a corresponding packet address 445. A contiguous application address space 950, which extends from zero upwards, is referenced by application 520. In particular, FIG. 5A depicts application 520 accessing address 956A in region 951A of application address space 950, and accessing address 956B in region 951B of application address space 950. (Note that from the perspective of application 520, there is no distinction between application address space regions 951A and 951B; the reason for denoting them separately in FIG. 5A will become apparent below).

Addresses in application address space 950 do not directly represent data locations (hence this address space is shown in dashed outline). Rather, these addresses must be passed to hardware translation unit 440, which converts them into corresponding addresses in packet address space 960 (which also extends upwards from zero in this particular embodiment). Thus address 956A in application address space is mapped by the hardware translation unit 440 into address 957A in packet address space, while address 956B in application address space is mapped by the hardware translation unit 440 into address 957B in packet address space. These packet addresses do reflect the actual location in memory of the desired data (albeit a translation from virtual to real address by the virtual memory system may still be required).

Note that although regions 951A and 951B are adjacent in application address space 950, this is not (necessarily) the case in packet address space 960. Thus region 951A in application address space 950 maps to region 961A in packet address space, and region 951B maps to region 961B in packet address space. As shown in FIG. 5A, the two regions 961A and 961B in packet address space may be separated from one another. Furthermore, data region 961A and/or 961B may not necessarily be word-aligned in packet address space 960, which would normally prevent straightforward manipulation of their contents by application 520. However, the mapping into application address space 950 provided by hardware translation unit ensures that they are indeed appropriately aligned, and so can be readily handled by application 520.

The mapping from application address space 950 to packet address space 960 by hardware translation unit 440 can be used to alleviate some of the problems discussed above in relation to the processing of incoming data packets. In this context, application 520 may (for example) represent layer A 501A in a protocol stack 505 (see FIG. 1), which is passed an incoming data packet by the next layer down (layer B 501B). The presence of hardware translation unit 440 allows layer B to pass layer A (i.e. application 520) an application address for the start of a packet. This then allows layer A to work with this packet as if it were a continuous block of data (in application address space), despite the fact that the data in this packet may actually be split up into two or more portions, typically due to header removal and/or packet combination by layer B 501B (plus by any lower layers in the protocol stack).

Figure 1A:
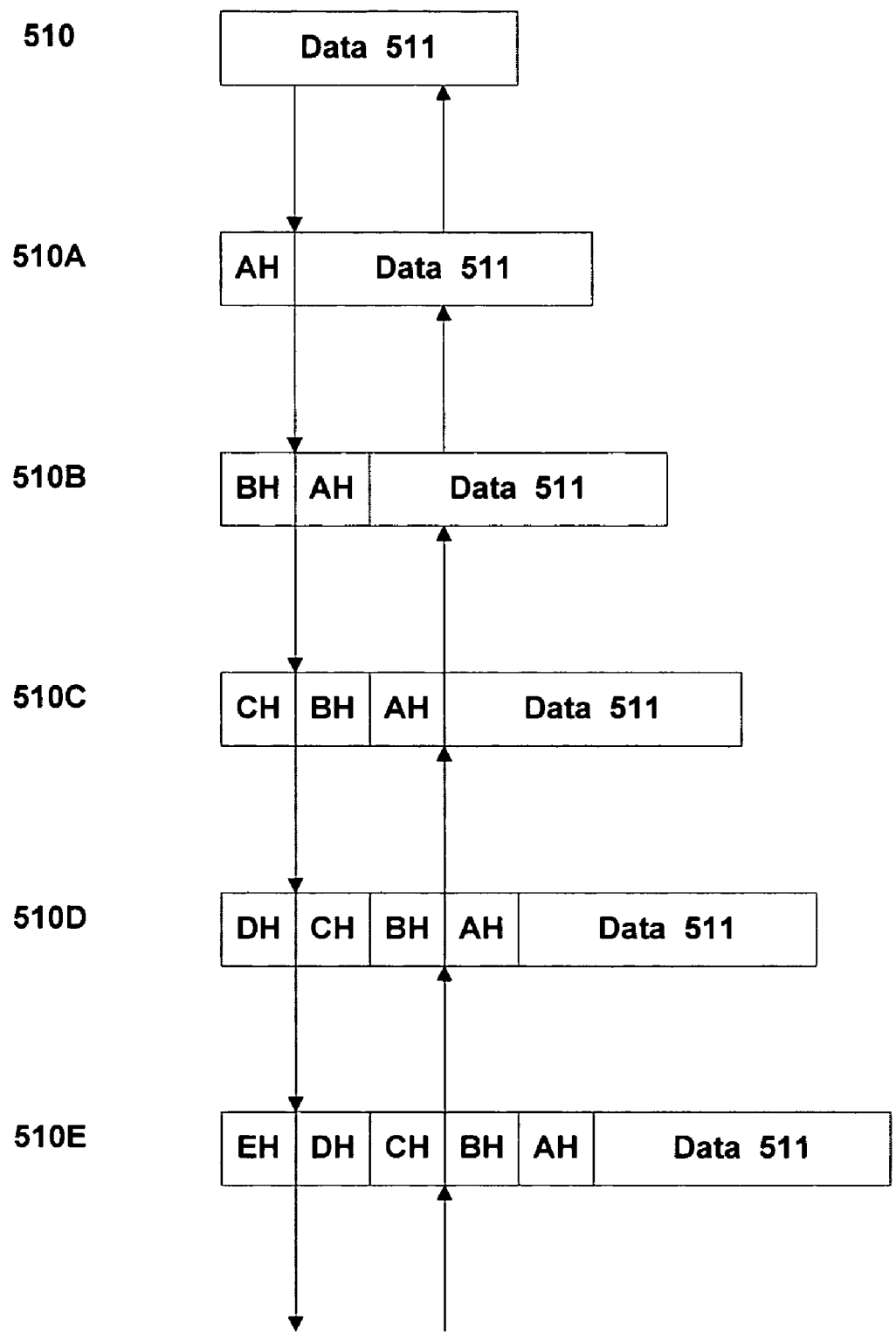
FIG. 1A is a schematic diagram illustrating the addition and removal of protocol headers as a data packet progresses up and down the protocol stack of FIG. 1.
Figure 1B:
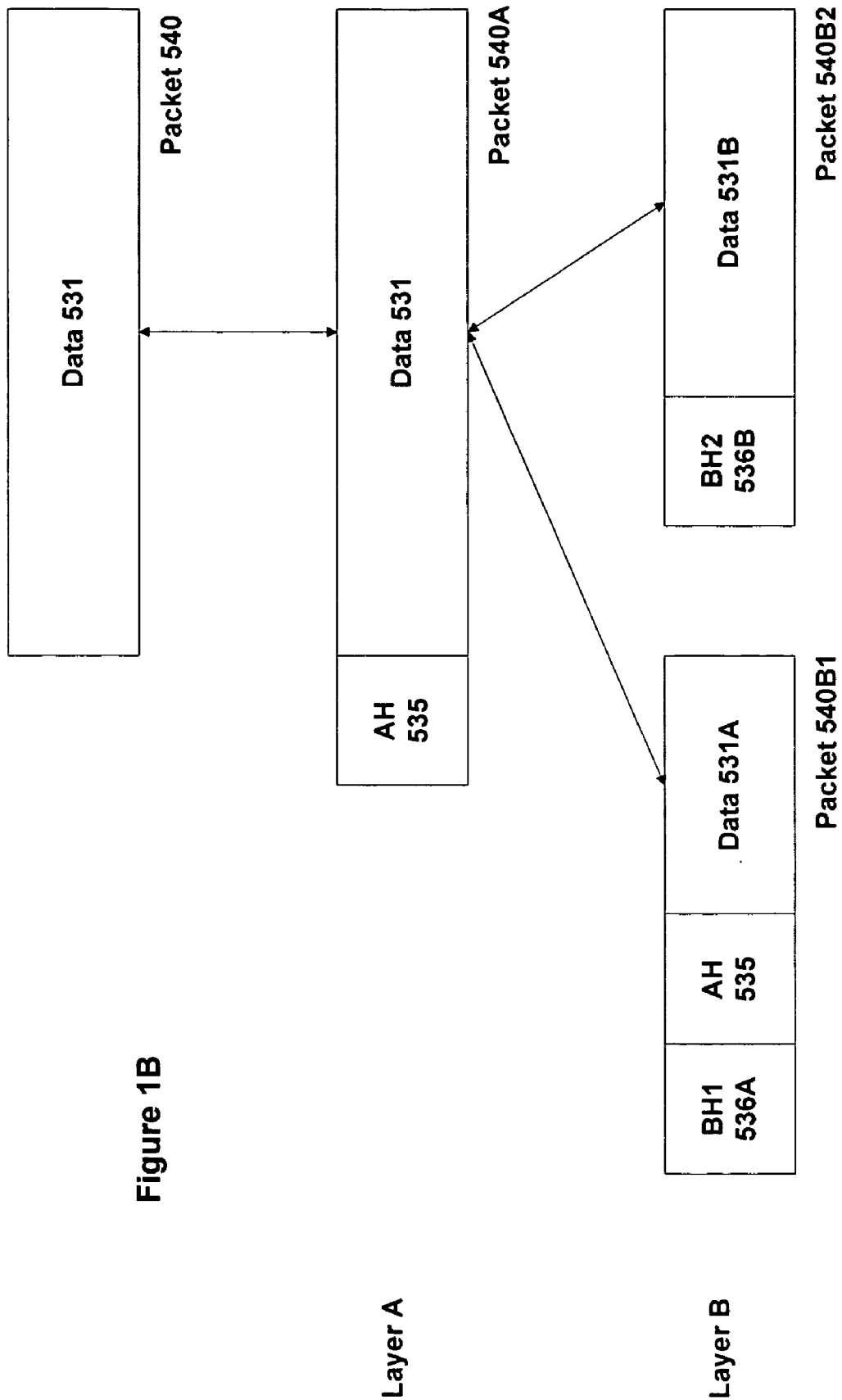
FIG. 1B is a schematic diagram illustrating the subdivision and reassembly of a data packet as it progresses up and down a protocol stack such as illustrated in FIG. 1.

FIG. 5A illustrates the particular situation discussed earlier in relation to FIGS. 1A and 1B, where a protocol layer B has stripped off the headers AH 970 and BH 971 of two incoming packets, and then combined these two packets into a single packet for handing to layer A. The hardware translation unit 440 allows the application 520 to access the two data portions 961A and 961B of the incoming data packets as a single, contiguous, word-aligned portion of application address space 950, in other words as a single packet. This is achieved by the hardware translation unit 440 performing the requisite mapping from application address space 950 into physical address space 960 (which corresponds to the actual configuration of data regions 961A and 961B in memory). Note that headers AH 970 and BH 971 are of no relevance to layer A, and so are not mapped into its application address space 950.

It will be appreciated that with this implementation, there is no need for layer B to copy the various components of an incoming packet (such as data regions 961A and 961B) into a single, word-aligned, region of memory. Rather, it can leave the data at its original location(s) in memory, which may be scattered across packet address space, and instead create an appropriate mapping for these various locations into application address space. This mapping, as entered into and then supported by hardware translation unit 440, allows application 520 (layer A) to treat the packet as if it had in fact been copied into a single block of memory. In other words, hardware translation unit 440 emulates the presence of such a single word-aligned packet (this is transparent to the application 520).

The use of a mapping from application address to packet address therefore allows much of the data copying in a communication stack to be eliminated, and so can provide significant performance enhancements. This is especially the case since translation unit 440 is implemented in hardware, and so the relevant mapping can be performed very quickly (analogous to the virtual to real address translation in a virtual memory system). The overhead associated with the mapping itself can be kept to a minimum.

Figure 6:
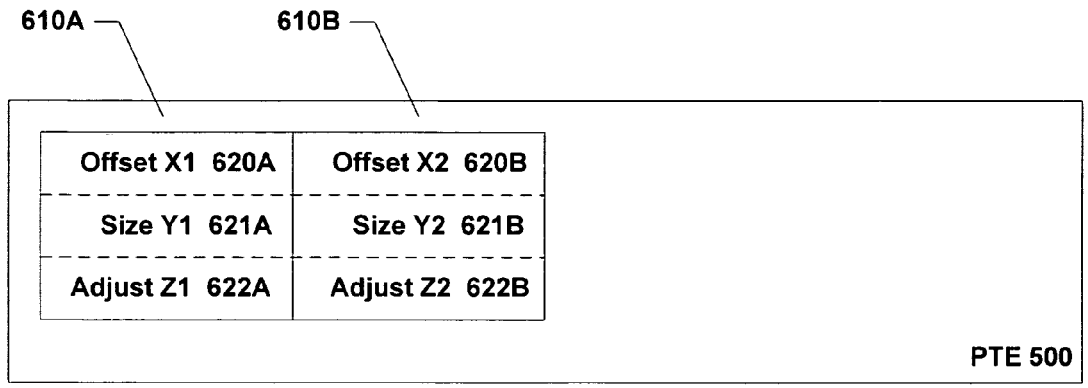
FIGS. 6 and 6A are schematic diagrams illustrating certain data structures within the hardware translation unit of FIG. 5.
Figure 6A:
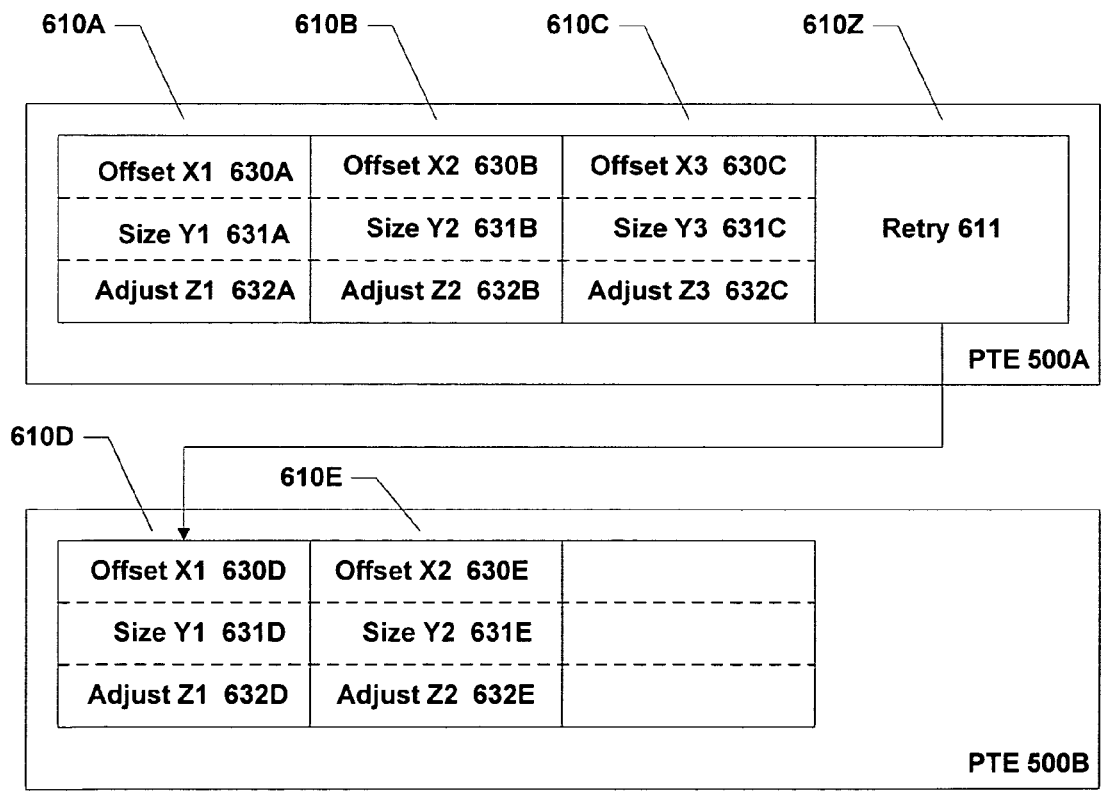

FIGS. 6 and 6A illustrate data structures for the PTEs 500 in hardware translation unit 440 in accordance with one embodiment of the invention. A PTE 500 contains one or more specifiers 610. For the particular embodiment illustrated in FIGS. 6 and 6A, the maximum number of specifiers that can be contained within any PTE 500 is four). There are two types of specifier 610. The first type of specifier, known as a translate specifier, details a mapping between an application address 435 and the corresponding packet address 445. The other type of specifier is a retry specifier 611. As described in more detail below, this is used to indicate that there are more translations (i.e. specifiers) required for this particular page than can be held in a single PTE 500.

Considering FIG. 6 first, this illustrates a PTE 500 containing two translate specifiers 610A and 610B (since this is less than the maximum capacity of a single PTE 500, no retry specifiers are required). Each translate specifier 610 details the portion of the memory page to which it relates (within the page corresponding to PTE 500), and the mapping to be applied to that particular portion of memory. In other words, a translate specifier 610A contains a mapping from application address to packet address that is appropriate to its associated portion of memory.

In the implementation of FIG. 6, each translate specifier 610A, 610B has three entries, namely offset 620, size 621, and adjustment 622. The offset 620 and size 621 entries are used in combination with one another to control the application address to which this particular specifier 610 applies. Thus a specifier is relevant to application addresses starting at the value given by offset 620 and extending for a range of addresses corresponding to size 621. Note that offset 620 is typically provided as an offset into the relevant page (corresponding to PTE 500), although it could instead be provided as a full application address. It will also be appreciated that there are other ways that could be used to detail the portion of memory covered by a particular specifier, such as by providing stop and start limits for the relevant address range.

The final entry in the specifier 610 is adjust 622. This represents the value that must be added to an application address to convert it into a packet address. Note that a single value (per specifier) for adjust 622 is appropriate if both the application and packet addresses are in a flat linear space, such as for standard virtual addresses. However, the skilled person will appreciate that more complex mappings or expressions for the adjust entry 622 may have to be used in other embodiments, depending upon the nature of the application addresses 635 and packet addresses 645 involved.

FIG. 6A illustrates the situation where there are five different mappings from application address 635 to packet address 645 for a single page. Accordingly, five translate specifiers are required, which is more than can be accommodated within a single PTE (in this particular embodiment). Consequently, a retry specifier 611 is used, which links from a first PTE 500A to a second (related) PTE 500B. The first PTE 500A therefore contains three translate specifiers 610A, 610B, and 610C, plus the retry specifier 611, for a total of four specifiers (the maximum), while the second PTE 500B contains the remaining two translate specifiers 610D, 610E. (Note that one can regard PTE 500A and 500B as separate, but linked PTEs, all corresponding to the same page, or simply as successive rows within the same PTE).

A retry specifier 611 firstly contains something to indicate that it is a retry specifier rather than a translate specifier. Each specifier may have a one-bit flag for this purpose. Another possibility is to use the size 631 entry of a translate specifier, and to set this entry to zero to indicate a retry specifier. The retry specifier 611 secondly contains some suitable reference or pointer to access the next linked PTE (e.g. in FIG. 6A, retry specifier 610Z includes an identifier that allows PTE 500B to be accessed).

It will be appreciated that although FIG. 6A depicts only two PTEs for a given page, there may be additional linked PTEs if the number of translate specifiers to accommodate for a page is sufficiently high (more than seven in this implementation). Of course, the maximum number of specifiers per PTE may vary from one embodiment to another, and may be greater than or less than four according to the particular circumstances. Thus it is usually quicker to search through the specifiers for a particular address if they are all in the same PTE (rather than in a hierarchy of linked PTEs). However, raising the maximum possible number of specifiers within a single PTE (and so decreasing the depth of the hierarchy) increases hardware complexity and cost, for example, by having to add more lines to a content addressable memory for storing the specifiers. In general, it is convenient to set the maximum number of specifiers per PTE (row) so that all the specifiers for a typical page can be accommodated within a single PTE. In these circumstances, retry specifiers are then only used for those pages that have a rather large number of specifiers.

In one embodiment, the offset, size, and adjustment entries in a specifier 610 permit memory mappings to a one-byte granularity. This then allows a data block that is not word-aligned to be mapped to (i.e. have an application address) that is word-aligned. It also permits portions of memory as small as one byte to have their own individual mappings. In other words, three consecutive bytes in application address space 950 may be mapped to three unrelated (i.e. non-adjacent) individual bytes in packet address space 960.

Figure 7:
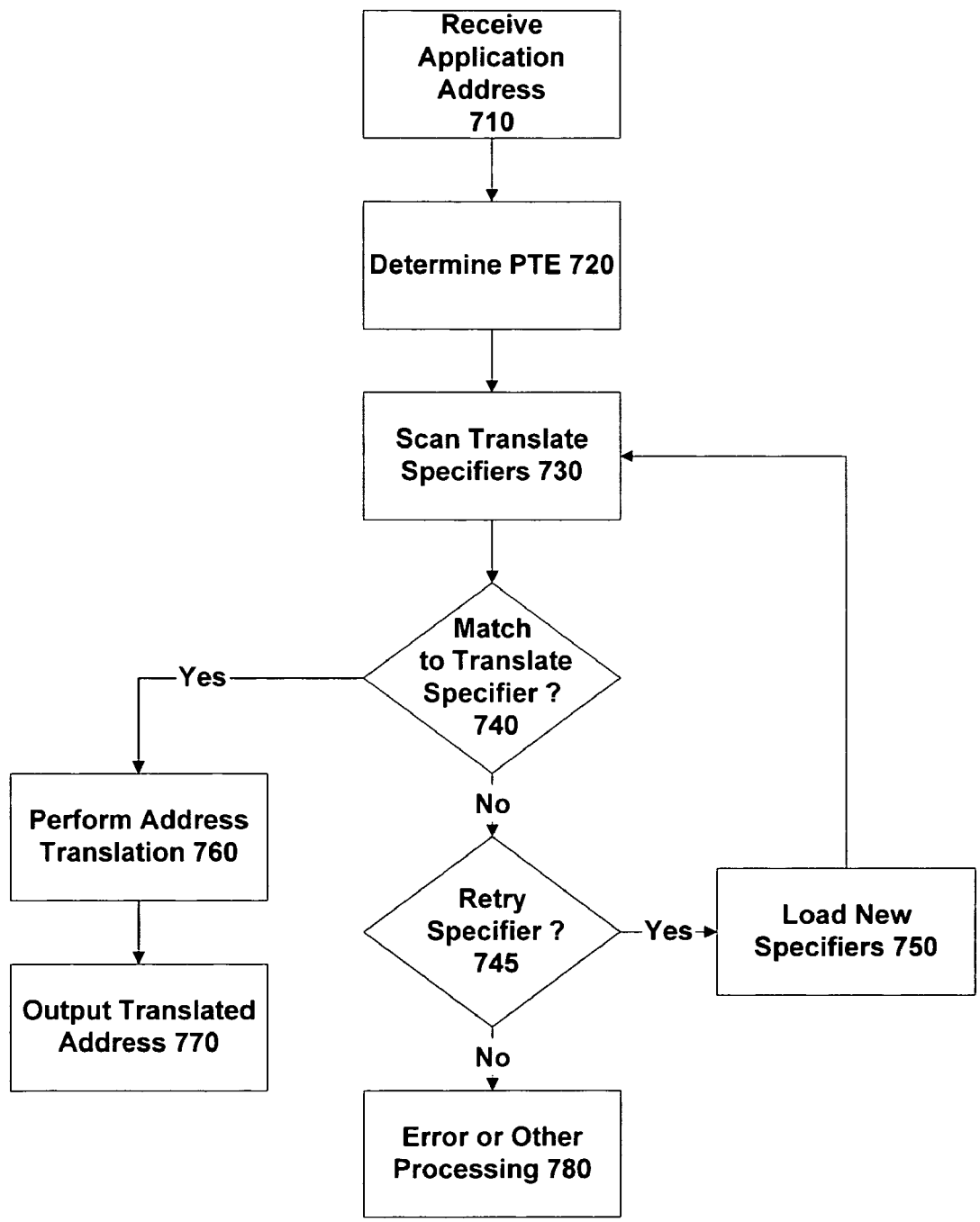
FIG. 7 is a flowchart depicting a method for converting from an application address into a packet address in accordance with one embodiment of the invention.

FIG. 7 depicts a flowchart of a procedure for using the hardware translation unit 440 to convert from an application address 435 into a packet address 445 in accordance with one embodiment of the invention. The procedure commences with receiving an application address to be mapped (step 710). Next, the page that contains the application address to be converted is identified, and then the corresponding PTE for this page is accessed (step 720). Methods for locating the relevant PTE are well-known in the art, such as from the operation of virtual memory systems (e.g. the application address 435 may be truncated to determine an index into the page table 460). Note that if there is a linked list of PTEs for any given page (such as PTE 500A and 500B in FIG. 6A) then we only search for the PTE at the head of the list—i.e. lower level PTEs such as 500B are not accessed directly, but only via the topmost PTE for the page.

Having located the (topmost) PTE 500 for the page containing the application address 435 to be converted, the translation process now determines the particular specifier 610 within this PTE that corresponds to the application address 435 (step 730). This involves accessing the specifiers from the PTE 500, and in particular examining the offset 630 and size 631 entries for each translate specifier to see whether or not they encompass the application address 435 to be converted. Note that a typical hardware implementation of address translation unit 440 is based on a content addressable memory (CAM). This then allows the application address 435 in question to be test simultaneously against all the translate specifiers (rather than accessing the translate specifiers on an individual basis).

If a translate specifier is found that encompasses the address to be mapped, (step 740) then the adjustment 632 associated with this specifier can be used to perform the desired address translation (step 760). Thus the adjustment 632 is added to the input application address 435 in order to determine the packet address 445 to be output (step 770).

However, if no matching translate specifier is found, a test is made to see if there is a retry specifier 611 in the PTE (step 445). Assuming that this is indeed the case, then the next set of specifiers for this page are accessed (step 750), i.e. those specifiers in the next layer down of the PTE hierarchy for that page. (This corresponds to progressing from PTE 500A to PTE 500B in FIG. 6A). Processing now loops back up to step 730, where an attempt is made to locate a matching translate specifier in the newly loaded specifiers, and continues as previously described. In this manner, a hierarchy of linked PTEs can be descended until the relevant translate specifier is ultimately located.

Returning to step 745, there may be no retry specifier, for example as shown in FIG. 6, if the application address is not within the range entered in either of the two translate specifiers 610A and 610B. Furthermore, in some implementations, a retry specifier 611 may have an address range associated with it, and step 745 would then test negative if the application address to be converted falls outside this range. (With this approach, the address range for a retry specifier would have to form a superset encompassing the address ranges of all the translate specifiers below it in the hierarchy).

A negative outcome from step 745 indicates that no particular mapping for the application address 435 is available in the PTE(s). Depending upon the implementation, this may represent an error situation, or may simply imply that no conversion of the application address is required (i.e. the packet address 445 is the same as the application address 435), and processing will therefore continue accordingly (step 780).

Figure 8:
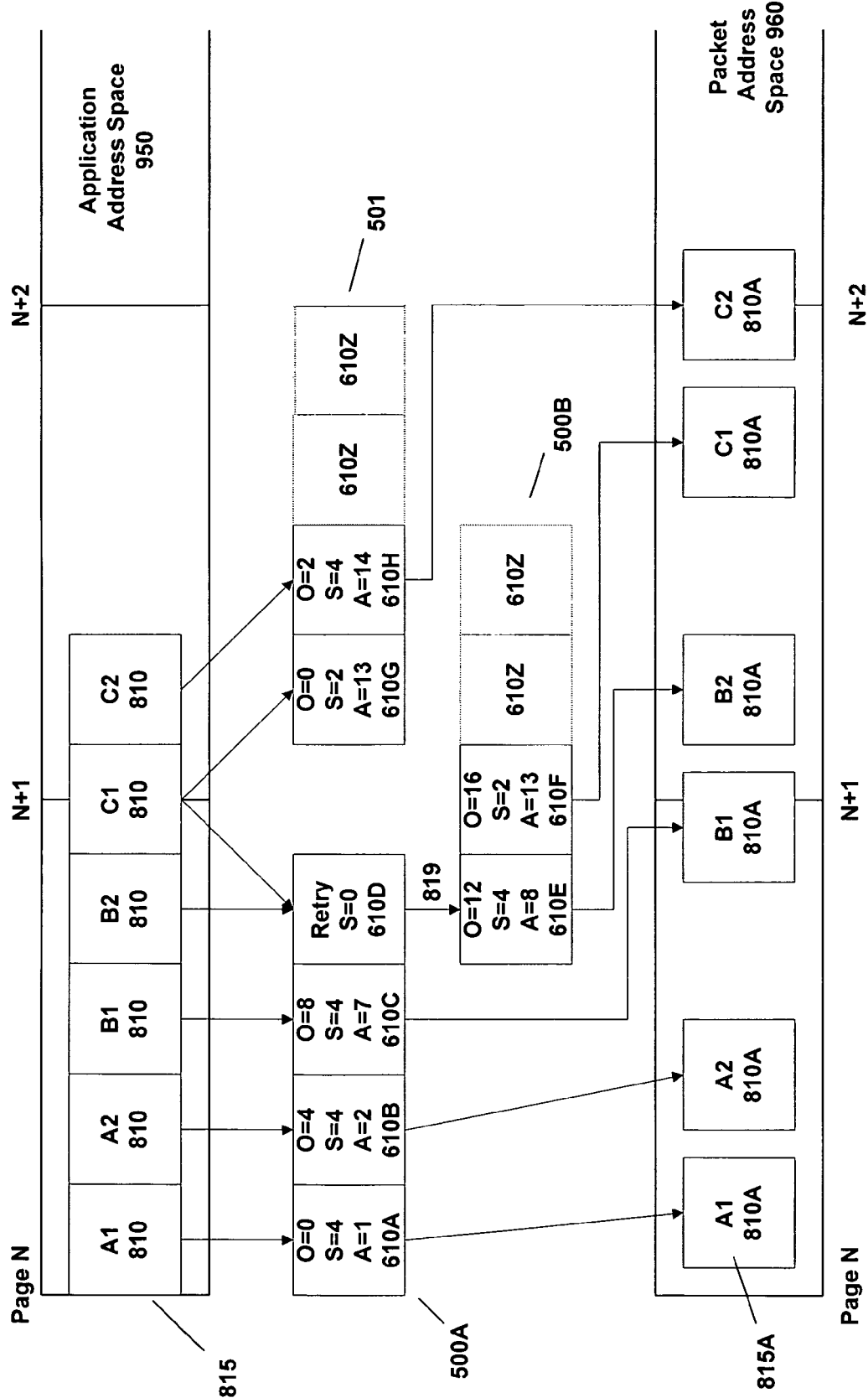
FIG. 8 is a schematic diagram illustrating a mapping from packet address to application address in accordance with one embodiment of the invention.

FIG. 8 illustrates in more detail the use of PTEs to map from application address space 950 to packet address space 960. In particular, a data packet 815 is depicted which comprises six sections 810 (A1, A2, B1, B2, C1, C2). Data packet 815 can be accessed in application address space 950 as a word-aligned contiguous chunk of memory, spanning from page N into page N+1. In other words, the division of data packet 815 into six sections is transparent in application address space. However, if we look at packet address space 960, we can see that the six sections 810 are discontiguously arranged in packet address space 960 (and this is assumed to reflect the underlying physical storage locations of the different sections). Moreover, not all of the sections 810 are necessarily word-aligned in physical address space 960. (It is also possible that the sections 810 vary in size from one to another, rather than all having the same size as shown in FIG. 8).

FIG. 8 also illustrates the PTEs 500 contained within the hardware translation unit 440 in order to map an application address 435 within data packet 815 to its associated packet address 445. More particularly, there are two PTEs 500A, 500B corresponding to page N (in application address space 950), and one PTE 501 corresponding to page N+1. Note that PTE 500A and 500B form a linked list, and could be regarded as multiple rows of a single overall PTE for page N.

PTE 500A contains four specifiers 610 (the maximum possible in this embodiment), namely three translate specifiers 610A, 610B, 610C, and one retry specifier 610D. This retry specifier contains a reference 819 to the associated PTE 500B for this page, which contains two further translate specifiers 610E, 610F for page N. PTE 501 only contains two translate specifiers 610G, 610H, since no more are needed to represent the mappings of page N+1.

Each translate specifier includes an offset (O), a size (S) and an adjustment (A). As previously explained in relation to FIGS. 6 and 6A, the offset and size together define the (application) address range to which that specifier relates. In other words, each specifier applies to the address range O–>O+S–1 (where an address is represented as an offset into the relevant page). For example, in FIG. 8 it is assumed that each page has an address range from 0 to 17. Section A1 corresponds to address range 0-3 (in page N), and so its associated translate specifier (610A) has O=0, S=4. Section B1 corresponds to address range 8-11, and so its associated translate specifier (610C) has O=8, S=4. Thus any application address within A1 will be mapped by translate specifier 610A, and any application address within B1 will be mapped by translate specifier 610C.

Section C1 spans a page boundary in application address space 950. Accordingly, it has two associated translate specifiers. The first of these translate specifiers 610F maps the portion of C1 in page N, and hence is accessed via PTE 500A (and PTE 500B); the second translate specifier 610G maps the portion of C1 in page N+1, and hence is accessed via PTE 501. Note that S=2 for these two translate specifiers 610F and 610G, since they each correspond to only half of section C1.

The adjustment value (A) in each translate specifier maps from the application address 435 to the packet address 445 for that portion of memory. In particular, the packet address 445 can be determined by adding the adjustment value (A) to the application address 435. For example, section A1 has an application start address equivalent to page=N, offset=0, and maps to a packet start address equivalent to page=N, offset=1 (i.e. O+A). Section C1 has an application start address equivalent to page=N, offset=12, and maps to a packet start address equivalent to page=N, offset=20 (which happens to be in page N+1).

It will be seen from FIG. 8 that a portion of memory may be mapped from one page in application address space 950 to another page in packet address space 960. Moreover, two portions of memory in the same page in application address space 950 may have different mappings to their respective portions of packet address space 960. Furthermore, the order of the portions in packet address space may be reversed (compared to that in application address space), and the memory portions may be separated by a small or large amount of address space (i.e. by just a part of a page, or by many pages).

Figure 9:
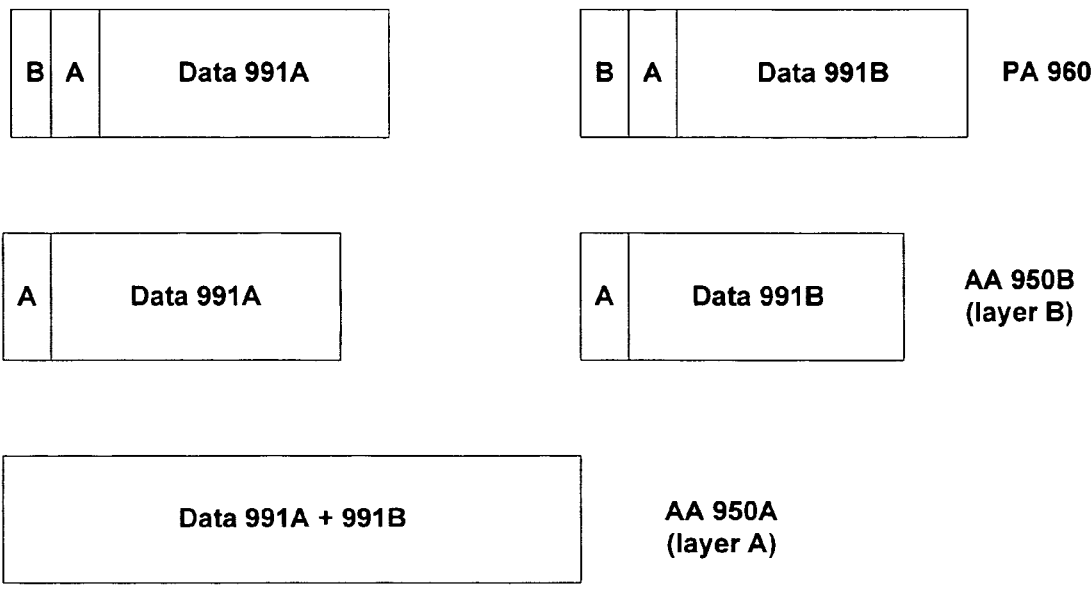
FIG. 9 is a schematic diagram illustrating the transition in application address as a packet passes from one layer to another.

The mapping from application address space 950 into packet address space 960 shown in FIG. 8 can typically arise as incoming communication packets are passed from one protocol layer up to another, but without copying the data as it is passed between layers. This situation is depicted in FIG. 9, which illustrates three rows of data packets. The top row illustrates the storage of two incoming packets in packet address space 960. We assume that the first packet occupies packet address range 0-7, and the second packet occupies packet address range 12-19. Each packet comprises a header from layer A, a header from layer B, each occupying one unit of the address range, and a data portion 991A, 991B, which occupies six units of the address range.

It is assumed that the two packets are received into layer B, which strips out the two header B portions. Note that this does not affect the underlying storage of the packets in packet address space 960, so that the top row of FIG. 9 remains valid. However, layer B now creates representations of these two packets in its application address space 950B, where header B is omitted. Typically, the two packets might now be located at address range 0-6 and 12-18 in application address space 950B, as depicted in the second row of FIG. 9. These two packets are now passed to layer A, which strips out the header A portions. Layer A then assembles the two packets into a single packet comprising data 991A and 991B. Layer A might typically locate this single packet at address range 0-11 in its own application address space 950A, as illustrated in FIG. 9.

Figure 10:
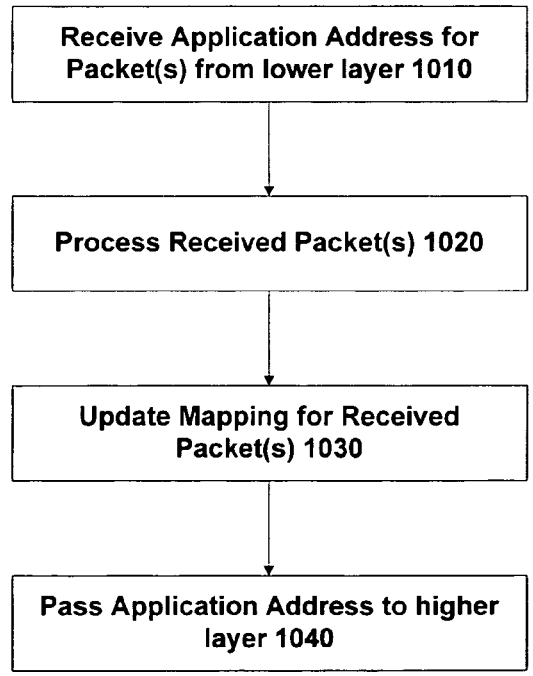
FIG. 10 is a flowchart depicting the processing associated with the transition of FIG. 9.

FIG. 10 provides a flowchart depicting the operations associated with processing incoming data packets in order to perform the address manipulation such as shown in FIG. 9. Thus an application address for one or more incoming packets is received by a protocol layer (step 1010), which then performs the processing associated with that layer (step 1020). As previously discussed, this may typically involved stripping out protocol headers and/or trailers, as well as combining two or more smaller packets into a larger packet.

The protocol layer now has to update the mapping from application address 950 to packet address 960 to reflect the processing performed at step 1020. (This is in contrast to having to copy the data to create a complete new copy of the data packet(s)). For example, layer B in FIG. 9 needs to generate two translate specifiers. The first maps from application address 0-6 to packet address 1-7, the second from application address 12-18 to packet address 13-19. Consequently, the first translate specifier has entries O=0, S=7, A=1, while the second translate specifier has entries O=12, S=7, A=1. (Note that although the same adjustment is present in both translate specifiers, it would not be appropriate to have a single translate specifier covering application address range 0-18, since the mapping of application address range 7-11 is, for present purposes, indeterminate).

If we now consider the action of layer A at step 1030, when this layer updates the mappings in the hardware translation unit 440, it must allow for existing mappings (i.e. as generated by layer B), plus its own operations. In the situation illustrated in FIG. 9, layer A can determine that two translate specifiers must again be created. The first of these maps from application address range 0-5 to packet address range 2-7, while the second maps from application address range 6-11 to packet address range 14-19. Thus the first translate specifier has entries O=0, S=6, A=2, while the second translate specifier has entries O=6, S=6, A=8.

Returning now to the flowchart of FIG. 10, once the hardware translation unit has been updated with the appropriate mapping(s), then the layer involved can forward the packet to the next layer in the protocol stack (step 1040) by means of a reference in the relevant address space. Thus layer B passes layer A a reference to a packet in application address space 950B, while layer A passes on a reference to the packet in application address space 950A. This therefore allows the receiving layer or program to treat the incoming packet as a single block of contiguous data, despite the fact that the underlying storage of the data may be quite different (as indicated by packet address space 960).

It will be appreciated that there are many variations on the particular embodiments described above. For example, while a particular form of page table has been used to perform address mappings based on a hierarchy of specifiers, the skilled person will be aware of a variety of other data structures that could be adopted for this purpose, such as a general lookup table, some appropriate form of database such as a binary tree, etc. Moreover, while it is normally advantageous for the address translation unit to be implemented in hardware, in order to enhance speed, a software implementation is also possible. Furthermore, while the embodiments have been described in the context of a computer having a page-based virtual memory system, it will be appreciated that other embodiments may be developed that do not have a virtual memory system.

In conclusion therefore, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. An address translation unit for use in a computer system, comprising:
   a set of translation table entries; wherein each translation table entry corresponds to a corresponding block of memory for an application executing on the computer system;
   wherein each translation table entry includes multiple specifiers, each specifier relating to a different portion of the corresponding block of memory, and each specifier mapping from an application address in that portion of the corresponding block of memory to a corresponding packet address for a data packet received with header information not needed by the application; and
   wherein all of the specifiers include the same quantity and type of specifier entries.

2. The address translation unit of claim 1, wherein said application address is presented as a virtual address.

3. The address translation unit of claim 2, wherein said packet address is presented as a virtual address.

4. The address translation unit of claim 1, wherein a block of memory corresponding to a translation table entry comprises a page of memory.

5. The address translation unit of claim 4, wherein contiguous application addresses within the same page of memory may map to discontiguous packet addresses.

6. The address translation unit of claim 1, wherein a specifier maps from an application address to a corresponding packet address by providing an offset between the two.

7. The address translation unit of claim 1, wherein each specifier contains limits defining the portion of memory to which that specifier relates.

8. The address translation unit of claim 1, wherein the specifiers in a translation table entry have a hierarchical arrangement, and wherein a retry specifier is defined to access a lower level in the hierarchy.

9. The address translation unit of claim 1, wherein each translation table entry comprises one or more translate specifiers, and zero or one retry specifiers, wherein a translate specifier defines a mapping between application address and packet address for a corresponding portion of memory, and a retry specifier points to a further translation table entry for that block of memory.

10. The address translation unit of claim 9, wherein the one or more translate specifiers and the zero or one retry specifiers for a translation table entry are stored in a content accessible memory.

11. The address translation unit of claim 1, wherein said different portions of memory have a one-byte granularity.

12. A memory management unit for a computer system for translating between virtual and real addresses, said memory management unit incorporating an address translation unit comprising:
   a set of translation table entries, wherein each translation table entry corresponds to a block of memory;
   wherein each translation table entry includes multiple specifiers, each specifier relating to a different portion of a corresponding block of memory and each specifier mapping from an application address in that portion of the block of memory to a corresponding packet address; and wherein all of the specifiers include the same quantity and type of specifier entries.

13. A computer system comprising:
   an address translation unit comprising:
   a set of translation table entries for mapping from an application address to a packet address, wherein each translation table entry corresponds to a block of memory;
   wherein each translation table entry includes multiple specifiers, each specifier relating to a different portion of a corresponding block of memory and each specifier mapping from the application address in that portion of the block of memory to a corresponding packet address; and
   a communications stack comprising a plurality of layers, wherein said address translation unit converts between an application address used in a higher layer of the communications stack and a packet address used in a lower layer of the communications stack.

14. A method of operating an address translation unit in a computer system, the method comprising:
   providing a set of translation table entries, wherein each translation table entry corresponds to a block of memory and maps from application addresses to packet addresses for the corresponding block of memory; and
   accessing one of multiple specifiers within each translation table entry, each specifier relating to a different portion of the block of memory corresponding to the relevant translation table entry, and each specifier mapping from an application address in that portion of the block of memory to a corresponding packet address for a data packet received with header information not needed by the application, wherein all of the specifiers include the same quantity and type of specifier entries.

15. The method of claim 14, wherein said application addresses comprise virtual addresses.

16. The method of claim 15, wherein said packet addresses comprise virtual addresses.

17. The method of claim 14, wherein a block of memory corresponding to a translation table entry comprises a page of memory.

18. The method of claim 17, wherein contiguous application addresses within the same page of memory may map to discontiguous packet addresses.

19. The method of claim 14 wherein a specifier maps from an application address to a corresponding packet address by providing an offset between the two.

20. The method of claim 14, wherein each specifier contains limits defining the portion of memory to which that specifier relates.

21. The method of claim 14, wherein the specifiers in a translation table entry have a hierarchical arrangement, and wherein a retry specifier is defined to access a lower level in the hierarchy.

22. The method of claim 14, wherein each translation table entry comprises one or more translate specifiers, and zero or one retry specifiers, wherein a translate specifier defines a mapping between application addresses and packet addresses for a corresponding portion of memory, and a retry specifier points to a further translation table entry for that block of memory.

23. The method of claim 22, wherein accessing a specifier within the determined translation table entry comprises:
    (a) searching the one or more translate specifiers for the translation table entry to locate a translate specifier corresponding to the application address;
    (b) if a translate specifier is located corresponding to the application address, using the mapping in that specifier to perform the translation from application address to packet address;
    (c) if a translate specifier is not located corresponding to the application address, searching for a retry specifier;
    (d) if a retry specifier is found, accessing a translation table entry identified by the retry specifier; and
    (e) returning to (a) to search the specifiers in the newly accessed translation table entry until the mapping is completed.

24. The method of claim 14, further comprising:
    receiving an application address;
    determining a translation table entry corresponding to a block of memory associated with the application address;
    locating within the determined translation table entry a specifier corresponding to a portion of memory associated with the application address; and
    using mapping information within the located specifier to map from the application address to the corresponding packet address.

25. The method of claim 24, wherein said application address is received by a second layer in a protocol stack from a first layer in a protocol stack and represents one or more incoming data packets being passed up the protocol stack, said method further comprising the first layer:
    processing the one or more incoming data packets to strip out header information associated with the first layer;
    updating translation table entries associated with the one or more incoming data packets to reflect the stripped out header information; and
    passing an application address for the one or more incoming data packets to the second layer in the protocol stack.

26. The method of claim 25, wherein the second layer uses the application address received from the first layer to access as a single contiguous address range the one or more incoming data packets processed by the first layer, despite the one or more incoming data packets not having been copied to a contiguous block of memory.

27. The method of claim 25, further comprising the first layer updating the translation table entries associated with the one or more incoming data packets to reflect a combination of two or more incoming data packets into a single data packet to pass to the second layer.

28. The method of claim 14, wherein said mapping from application address to packet address is performed with a one-byte granularity.

29. An address translation unit for use in a computer system, comprising:
    a set of translation table entries for mapping from an application address to a packet address, wherein each translation table entry corresponds to a block of memory, wherein said mapping is performed at a one-byte granularity, and wherein each translation table entry includes multiple specifiers that each include the same quantity and type of specifier entries.

30. The address translation unit of claim 29, wherein each specifier relates to a different portion of the block of memory and maps at a one-byte granularity from an application address in that portion of the block of memory to a corresponding packet address.

31. A method of handling incoming data packets in a communications protocol stack comprising at least a first layer and a second layer, said method comprising:
    receiving one or more incoming data packets in the first layer;
    processing in the first layer the one or more incoming data packets to strip out header information associated with the first layer;
    updating an address translation unit that maps from application address to packet address to reflect the stripped out header information, said address translation unit operating to a one-byte granularity;
    passing an application address for the one or more incoming data packets to the second layer in the protocol stack
    wherein the second layer uses the application address received from the first layer to access as a single contiguous address range the one or more incoming data packets processed by the first layer, despite the one or more incoming data packets not having been copied to a contiguous block of memory.

32. The method of claim 31, further comprising the first layer updating the translation table entries associated with the one or more incoming data packets to reflect a combination of two or more incoming data packets into a single data packet to pass to the second layer.

33. The method of claim 31, further comprising the second layer:
    processing the one or more incoming data packets received from the first layer to strip out header information associated with the second layer;
    updating the address translation unit to reflect the header information stripped out by the second layer; and
    passing an application address for the one or more incoming data packets to a third layer in the protocol stack, wherein the third layer uses the application address to access the one or more incoming data packets via the address translation unit.

34. The method of claim 31, wherein said mapping from application address to packet address is performed with a one-byte granularity.

35. A communications system including a protocol stack for handling incoming data packets, the protocol stack comprising at least a first layer and a second layer, and an address translation unit operable to map from application addresses to packet addresses, wherein said first layer processes one or more incoming data packets to strip out header information associated with the first layer, and updates the address translation unit to reflect the stripped out header information, and wherein the second layer receives an application address for the one or more incoming data packets from the first layer in the protocol stack, and uses the application address to access the one or more incoming data packets via the address translation unit, which includes a set of translation table entries, each of which corresponds to a block of memory and includes multiple specifiers that each include the same quantity and type of specifier entries.

\* \* \* \* \*

UNITED STATES PATENT AND TRADEMARK OFFICE
CERTIFICATE OF CORRECTION

| | |
|---|---|
| PATENT NO. | : 7,356,667 B2 |
| APPLICATION NO. | : 10/850676 |
| DATED | : April 8, 2008 |
| INVENTOR(S) | : Jeremy G. Harris et al. |

It is certified that error appears in the above-identified patent and that said Letters Patent is hereby corrected as shown below:

In column 3, line 5, delete "SOS." and insert --505.--.

Signed and Sealed this

Nineteenth Day of August, 2008

JON W. DUDAS
*Director of the United States Patent and Trademark Office*